(12) United States Patent
Glucksman

(10) Patent No.: US 12,261,511 B2
(45) Date of Patent: Mar. 25, 2025

(54) INTEGRATED ALTERNATOR FOR AERIAL VEHICLE ENGINE

(71) Applicant: Textron Innovations Inc., Providence, RI (US)

(72) Inventor: Michael Glynn Glucksman, Montgomery, PA (US)

(73) Assignee: Textron Innovations Inc., Providence, RI (US)

( * ) Notice: Subject to any disclaimer, the term of this patent is extended or adjusted under 35 U.S.C. 154(b) by 335 days.

(21) Appl. No.: 17/748,238

(22) Filed: May 19, 2022

(65) Prior Publication Data

US 2022/0371742 A1 Nov. 24, 2022

Related U.S. Application Data

(60) Provisional application No. 63/190,441, filed on May 19, 2021.

(51) Int. Cl.
*H02K 7/18* (2006.01)
*H02K 1/16* (2006.01)
(Continued)

(52) U.S. Cl.
CPC ............ *H02K 7/1823* (2013.01); *H02K 1/16* (2013.01); *H02K 1/2795* (2022.01); *H02K 3/28* (2013.01); *H02K 9/06* (2013.01)

(58) Field of Classification Search
CPC ...... H02K 7/1823; H02K 1/16; H02K 1/2795; H02K 3/28; H02K 9/06; H02K 7/14; H02K 21/12
See application file for complete search history.

(56) References Cited

U.S. PATENT DOCUMENTS

| 4,556,366 A | 12/1985 | Sargisson et al. |
| 6,962,135 B2 | 11/2005 | Kahlon et al. |

(Continued)

FOREIGN PATENT DOCUMENTS

| CN | 107310734 | 11/2017 |
| EP | 1885046 | 2/2008 |

(Continued)

OTHER PUBLICATIONS

Dopona, Michael et al., "SAE International 912iS Fuel Injected Aircraft Engine", Copyright 2012 SAE International and Copyright 2012 SAE Japan; 10 pages.

(Continued)

*Primary Examiner* — Thomas Truong
(74) *Attorney, Agent, or Firm* — BainwoodHuang

(57) ABSTRACT

A technique for generating electrical power from an engine in an aerial vehicle includes providing an alternator disk structure (ADS) between the engine and a propeller of the vehicle. The ADS is disposed concentrically with an engine drive shaft that drives the propeller and includes at least two concentric regions, a first region having a stator and a second region having a rotor. The first region is rotationally fixed relative to the engine, and the second region is coupled to a drive shaft of the engine. As the engine rotates the drive shaft, the rotor disposed in the second region spins concentrically relative to the stator disposed in the first region, thereby inducing electrical current in windings of the stator. The rotor and the stator thus work together to generate electrical power, which may be conveyed from the stator to electrical subsystems and controls of the vehicle.

18 Claims, 6 Drawing Sheets

(51) Int. Cl.
*H02K 1/27* (2022.01)
*H02K 1/2795* (2022.01)
*H02K 3/28* (2006.01)
*H02K 9/06* (2006.01)

(56) References Cited

U.S. PATENT DOCUMENTS

| | | |
|---|---|---|
| 7,152,569 B2 | 12/2006 | Leiber et al. |
| 7,159,680 B2 | 1/2007 | Pichler et al. |
| 2003/0089822 A1* | 5/2003 | Koch .............. F16F 15/173 244/60 |
| 2006/0214054 A1 | 9/2006 | Fuerlinger et al. |
| 2008/0174194 A1* | 7/2008 | Qu .................. H02K 21/12 290/52 |
| 2010/0021295 A1 | 1/2010 | Perkinson et al. |
| 2011/0049902 A1 | 3/2011 | Miekka et al. |
| 2015/0048705 A1* | 2/2015 | Davey .............. H02K 16/02 175/195 |
| 2018/0102695 A1* | 4/2018 | Lee ................. H02K 7/104 |
| 2018/0219441 A1* | 8/2018 | Thiele .............. H02K 1/146 |
| 2019/0010874 A1* | 1/2019 | Perkinson ........... F02C 7/262 |
| 2019/0131902 A1* | 5/2019 | Ciciriello ......... F16C 17/028 |
| 2019/0199151 A1* | 6/2019 | Loder ............... H02K 1/02 |
| 2020/0076286 A1* | 3/2020 | Lin ................. H02K 3/20 |
| 2021/0313854 A1* | 10/2021 | Sedlak .............. H02K 1/276 |
| 2022/0224199 A1* | 7/2022 | Shirazee ............ H02K 9/06 |
| 2023/0026754 A1* | 1/2023 | Serghine ........... F01D 15/10 |

FOREIGN PATENT DOCUMENTS

| | | |
|---|---|---|
| EP | 2218643 | 8/2010 |
| EP | 3599704 | 1/2020 |
| JP | 2008148550 | 6/2008 |
| JP | 2011512118 | 4/2011 |
| WO | 2020011867 | 1/2020 |

OTHER PUBLICATIONS

Lycoming; "EL-005 Engine, Lycoming Engines Reliability Heavy-Fuel Capability, Integrated Permanent Magnet Alternator, Digital Electronic Control, Fielded Flight Hours 10,000"; 2016; 2 pages.
JP 2023-572079 Office Action, dated Oct. 1, 2024, 6 pages.

* cited by examiner

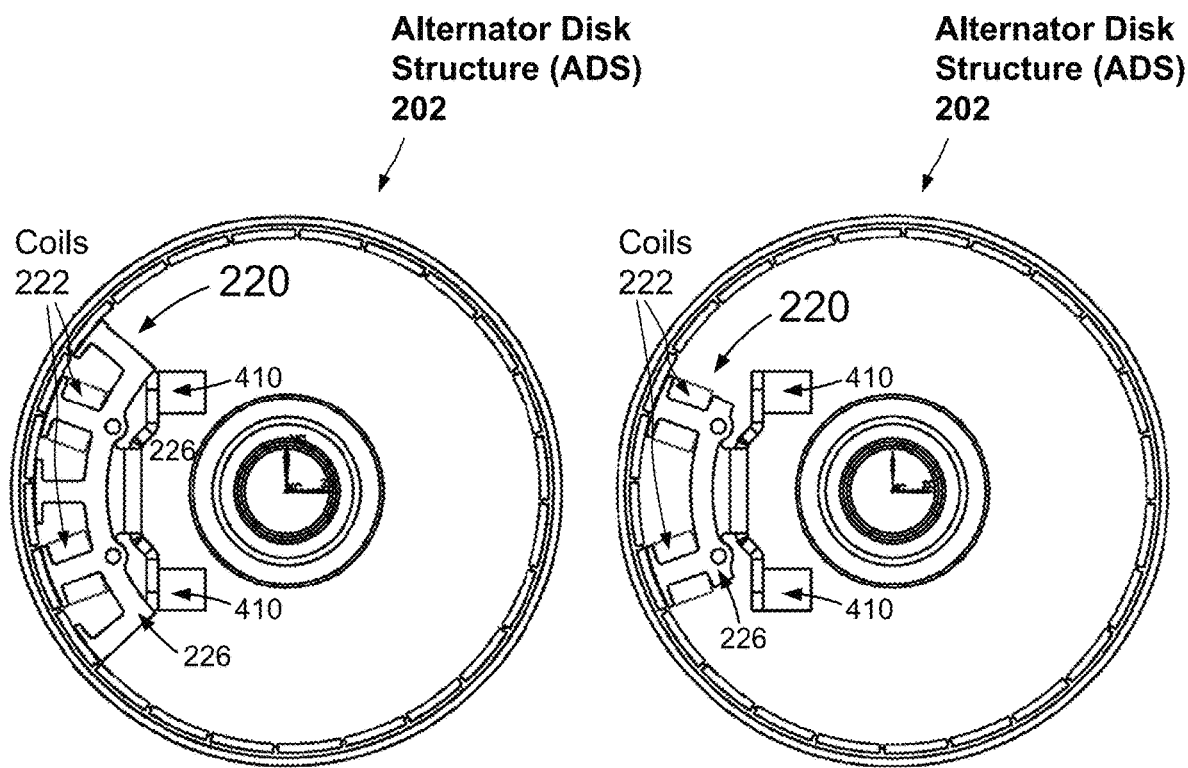
FIG. 6A  FIG. 6B
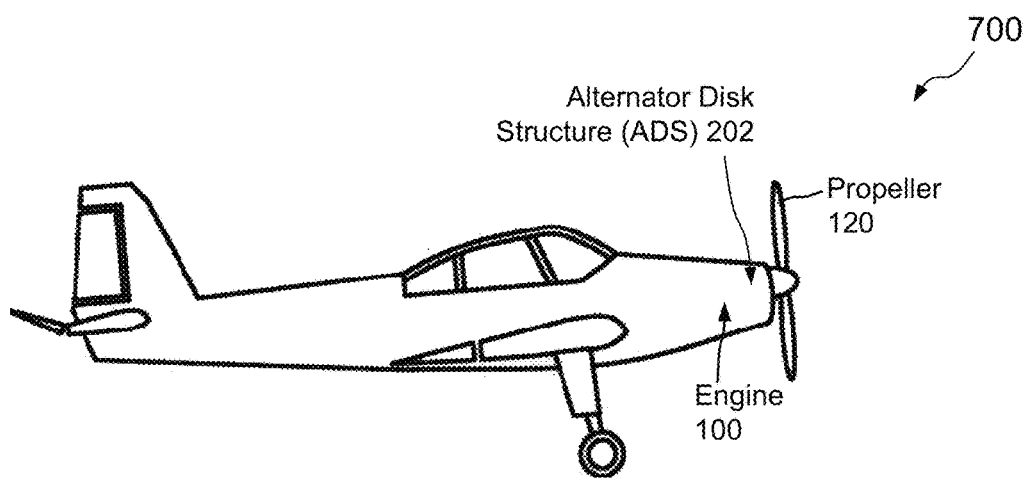
FIG. 7

INTEGRATED ALTERNATOR FOR AERIAL VEHICLE ENGINE

BACKGROUND

Propeller-driven aircraft, such as airplanes, helicopters, UAVs (unmanned aerial vehicles), and the like, commonly generate electrical power for running various subsystems and controls. Such power may generally be supplied by an alternator. In a common arrangement, the alternator is coupled via a belt to the drivetrain of an engine. As the engine spins, some of the power from the engine is transferred to the alternator, which distributes power to the various subsystems via cabling.

FIGS. 1A and 1B show front and bottom views, respectively, of an example prior design. As shown, an engine 100 has a drive shaft 110 coupled to a propeller 120. An alternator 130 is coupled to the drivetrain via a belt 140, and an idler pulley 150 may be adjustable to achieve a desired amount of belt tension. As the engine 100 spins the propeller 120, the belt 140 rotates a rotor within the alternator 130 relative to a stator. Relative rotation of the rotor with respect to the stator generates electrical power. The arrangement of FIGS. 1A and 1B may further include a second alternator 160. The second alternator 160 may be provided for redundancy and/or as an additional source of electrical power.

SUMMARY

Unfortunately, the above-described arrangement is not ideal. For example, the belt-driven alternator of FIGS. 1A and 1B tends to be heavy and inefficient. The alternators 130 and 160 can weigh multiple kilograms each and typically do not exceed 65% power efficiency. They also require careful maintenance, as belts wear out, requiring regular re-tensioning and eventual replacement. The belt-driven alternators 130 and 160 also tend to consume significant space, especially space to the side of the drive shaft. In an airplane or UAV, such space requirements can cause the cowling of the vehicle to be wider that it would otherwise be, resulting in a less aerodynamic design than is possible. Aerodynamics may be similarly constrained in both front-propeller arrangements (e.g., "tractors") and in rear-propeller arrangements (e.g., "pushers"). What is needed is a more efficient alternator design.

In contrast with the above-described prior approach, an improved technique for generating electrical power from an engine in an aerial vehicle includes providing an alternator disk structure (ADS) between the engine and a propeller of the vehicle. The ADS is disposed concentrically with a drive shaft that drives the propeller and includes at least two concentric regions, a first region having a stator and a second region having a rotor. The first region is rotationally fixed relative to the engine, and the second region is coupled to the engine drive shaft. As the engine rotates the drive shaft, the rotor disposed in the second region spins concentrically relative to the stator disposed in the first region, thereby inducing electrical current in windings of the stator. The rotor and the stator thus work together to generate electrical power, which may be conveyed from the stator to electrical subsystems and controls of the vehicle.

Advantageously, the improved technique provides the functionality of an alternator without requiring the same external hardware. Weight requirements are substantially reduced. No belt, tensioner, or brackets to hold an external alternator are needed. In addition, space requirements to the side of the engine may be diminished considerably, enabling a more aerodynamic vehicle design.

The improved technique may provide advantages in terms of electrical efficiency, as well. Belt losses are completely avoided, and the larger radial geometry of the ADS, compared with that of external alternators, may provide additional efficiency benefits.

Certain embodiments are directed to an apparatus for generating electrical power in an aerial vehicle having an engine, a propeller, and a drive shaft coupled between the engine and the propeller. The apparatus includes an alternator disk structure (ADS) disposed between the engine and the propeller, the ADS including an inner region and an outer region. The inner region of the ADS is rotationally fixed relative to the engine and includes a stator, the stator having windings. The outer region of the ADS is free to rotate relative to the inner region. The outer region coupled to the drive shaft and includes a rotor having magnets. The rotor of the outer region is constructed and arranged to spin relative to the stator of the inner region in response to rotation of the drive shaft by the engine, thereby inducing electrical current in the windings of the stator.

In some embodiments, the outer region of the ADS is part of a starter ring gear support (SRGS) coupled to an electric starter. The SRGS is constructed and arranged to rotate the drive shaft for starting the engine.

In some examples, the ADS is disposed within a cowling of the aerial vehicle.

In some examples, the ADS is disposed outside an oil-filled portion 310 of the engine.

In some examples, the outer region is coupled to the drive shaft via a coupling.

In some examples, the rotor includes a plurality of permanent magnets uniformly spaced at regular angular intervals.

In some examples, the ADS is provided in multiple configurations, the configurations including a first configuration in which the rotor has a relatively smaller diameter suited for relatively lower-power applications, and a second configuration in which the rotor has a relatively larger diameter suited for relatively higher-power applications.

In some examples, the rotor has a greater number of magnets in the second configuration than in the first configuration, and the stator has a greater number of coils in the second configuration than in the first configuration.

In some examples, the rotor has more powerful magnets in the second configuration than in the first configuration.

In some examples, the windings of the inner region are provided in multiple groups 420, wherein the windings within each group are electrically connected together but are electrically isolated from the windings of any other group.

In some examples, the inner region has an outer circumference, and the windings of inner region are disposed along the outer circumference in a clustered manner, such that the windings are not distributed uniformly along the outer circumference.

In some examples, the apparatus further includes at least one AC-to-DC converter 510 integral to the inner region.

In some examples, the apparatus further includes at least one AC-to-AC converter 512 integral to the inner region.

In some examples, the apparatus further includes electronic control circuitry 520 coupled to the stator, the electronic control circuitry constructed and arranged to back-drive the windings of the stator.

In some examples, the electronic control circuitry constructed and arranged to back-drive the windings of the stator is further constructed and arranged to start the engine.

In some examples, the electronic control circuitry constructed and arranged to back-drive the windings of the stator is further constructed and arranged to provide power for rotating the propeller in a fuel-electric hybrid arrangement.

Other embodiments are directed to an aerial vehicle, which includes an engine having a drive shaft, a propeller coupled to the drive shaft, a first disk region rotationally fixed relative to the engine and including a stator, the stator having windings, and a second disk region coupled to the drive shaft and including a rotor. The first disk region and the second disk region are each concentric with the drive shaft. The second region is constructed and arranged to spin relative to the first region in response to rotation of the drive shaft, thereby causing the rotor to rotate relative to the stator and inducing electrical current in the windings of the stator.

In some examples, the second region is part of a starter ring gear support (SRGS) coupled to an electric starter. The SRGS is constructed and arranged to rotate the drive shaft for starting the engine.

Still other embodiments are directed to a method of generating electrical power in an aerial vehicle. The method includes operating an engine of the aerial vehicle to rotate a propeller via a drive shaft. The method further includes providing a first disk region that is rotationally fixed relative to the engine, the first disk region including a stator, and providing a second disk region, the first disk region and the second disk region each being concentric with the drive shaft, the second disk region including a rotor. The method still further includes coupling the drive shaft to the second disk region, such that an array of magnets of the rotor rotates along with the drive shaft. The method further includes, as the array of magnets rotates, inducing electrical current to flow within windings of the stator.

In some examples, the method further includes providing a first configuration in which the rotor has a relatively smaller diameter suited for relatively lower-power applications, and providing a second configuration in which the rotor has a relatively larger diameter suited for relatively higher-power applications.

The foregoing summary is presented for illustrative purposes to assist the reader in readily grasping example features presented herein; however, this summary is not intended to set forth required elements or to limit embodiments hereof in any way. One should appreciate that the above-described features can be combined in any manner that makes technological sense, and that all such combinations are intended to be disclosed herein, regardless of whether such combinations are identified explicitly or not.

BRIEF DESCRIPTION OF THE SEVERAL VIEWS OF THE DRAWINGS

The foregoing and other features and advantages will be apparent from the following description of particular embodiments, as illustrated in the accompanying drawings, in which like reference characters refer to the same or similar parts throughout the different views. The drawings are not necessarily to scale, emphasis instead being placed upon illustrating the principles of various embodiments.

FIGS. 6A and 6B are cross-sectional front views of respective additional embodiments.

FIG. 7 is a side view of an example aviation vehicle.

DETAILED DESCRIPTION

Figure 1A:
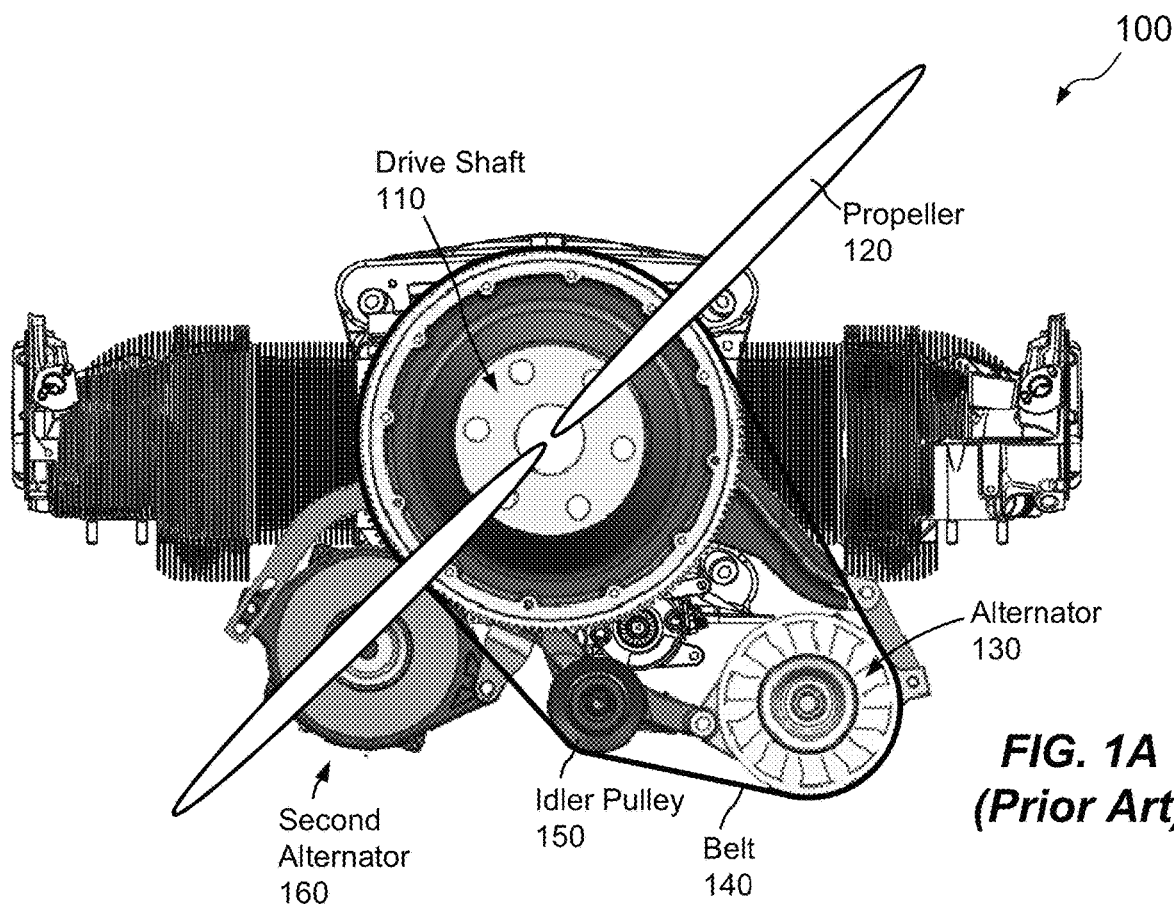
FIGS. 1A and 1B are respectively front and bottom views of an aviation engine that includes conventional alternators for generating electrical power.
Figure 1B:
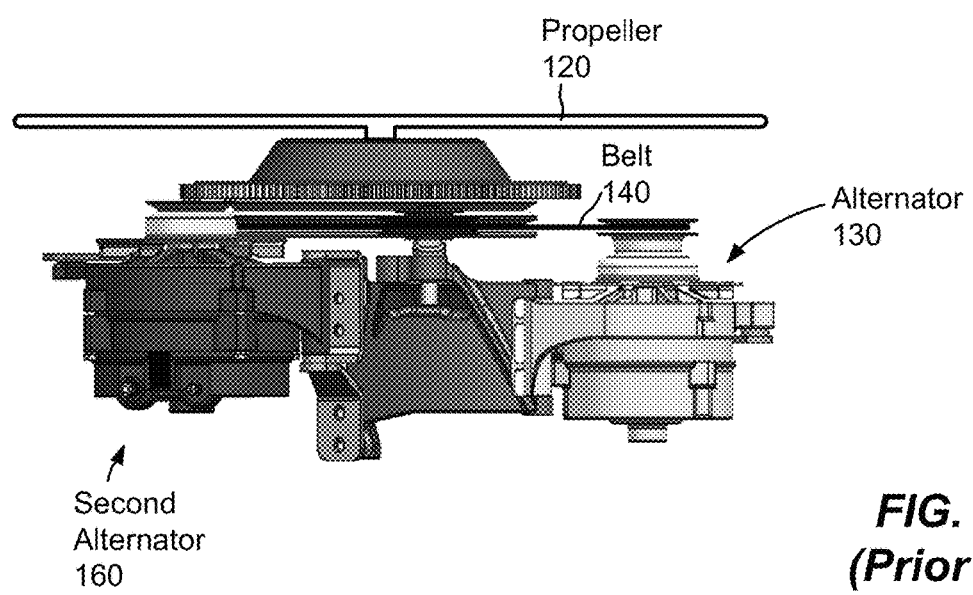

Embodiments of the improved technique will now be described. One should appreciate that such embodiments are provided by way of example to illustrate certain features and principles but are not intended to be limiting.

An improved technique for generating electrical power from an engine in an aerial vehicle includes providing an alternator disk structure (ADS) between the engine and a propeller of the vehicle. The ADS is disposed concentrically with a drive shaft that drives the propeller and includes at least two concentric regions, a first region having a stator and a second region having a rotor. The first region is rotationally fixed relative to the engine, and the second region is coupled to a drive shaft of the engine. As the engine rotates the drive shaft, the rotor disposed in the second region spins concentrically relative to the stator disposed in the first region, thereby inducing electrical current in windings of the stator. The rotor and the stator thus work together to generate electrical power, which may be conveyed from the stator to electrical subsystems and controls of the vehicle.

In some examples, the first region is an inner region and the second region is an outer region. In other examples, the first region is an outer region and the second region is an inner region.

In some examples, the second portion of the disk is part of an existing structure referred to herein as a starter ring gear support (SRGS). The SRGS is coupled to an electric starter, which is configured to rotate the drive shaft for starting the engine.

In some examples, the ADS is positioned at an end of the vehicle (front or rear), where it is easily accessible for inspection, maintenance, and service. For instance, the ADS is located inside a cowling of the vehicle, and obtaining access to the ADS does not require opening any oil-containing part of the engine itself.

In some examples, the ADS meets a wide range of power requirements in a scalable manner. For instance, the stator design may be varied to provide different numbers or configurations of coils to suit different power requirements. "Coils" as used herein refer to conductive paths formed by one or more "windings," i.e., turns of an electrically conductive material around a magnetic-permeable core of the stator. An individual coil may be formed from a single wire or other elongated conductor. Smaller numbers of coils may be provided for lower-power applications, and larger numbers of coils may be provided for higher-power applications. As the stator does not rotate with the drive shaft, stator coils may be wired in any convenient manner, without concern for weight balancing.

Various rotor designs may be provided, as well. For instance, rotors with smaller diameters may be used for lower-power applications, whereas rotors with larger diameters may be used for higher-power applications, including hybrid (fuel-electric) drive arrangements. Larger-diameter rotors permit the use of larger and/or more numerous magnets positioned at or near an outer rim of the ADS, effectively multiplying power output based on both (i) larger and/or more numerous magnets and (ii) greater linear velocity of magnets of the rotor with respect to coils of the stator.

In some examples, the rotor employs permanent magnets and thus requires no electrical connections or brushes. In some examples, the permanent magnets are neodymium magnets. Other types of magnets may be used, however, such as electromagnets and magnets made of other materials. In some examples, the magnets of the rotor are evenly spaced at uniform angular intervals.

In some examples, the ADS includes or is otherwise coupled to an AC-to-DC converter, for converting AC power from the stator to DC power for running various subsystems. Any number of AC-to-DC converters may be provided. Such AC-to-DC converters may be integrated with the stator or provided separately, e.g., on a separate circuit board located near the engine. In some examples, the ADS may include or otherwise be coupled to any number of AC-to-AC converters (e.g., transformers).

According to some examples, electronic control circuitry, coupled to the stator, is provided for back-driving the windings of the stator. Such back-driving has the effect of inducing rotation of the rotor and hence of the drive shaft and propeller of the vehicle, and thus may be suitable as a replacement for a separate starter motor. It may also provide support for electrical drive, e.g., in a fuel-electric hybrid arrangement. For example, the back-driving circuitry may be connected to a battery and may directly drive the propeller via electrical power. Electric power may assist with takeoff and may help to offset maximum power requirements of the engine.

Figure 2:
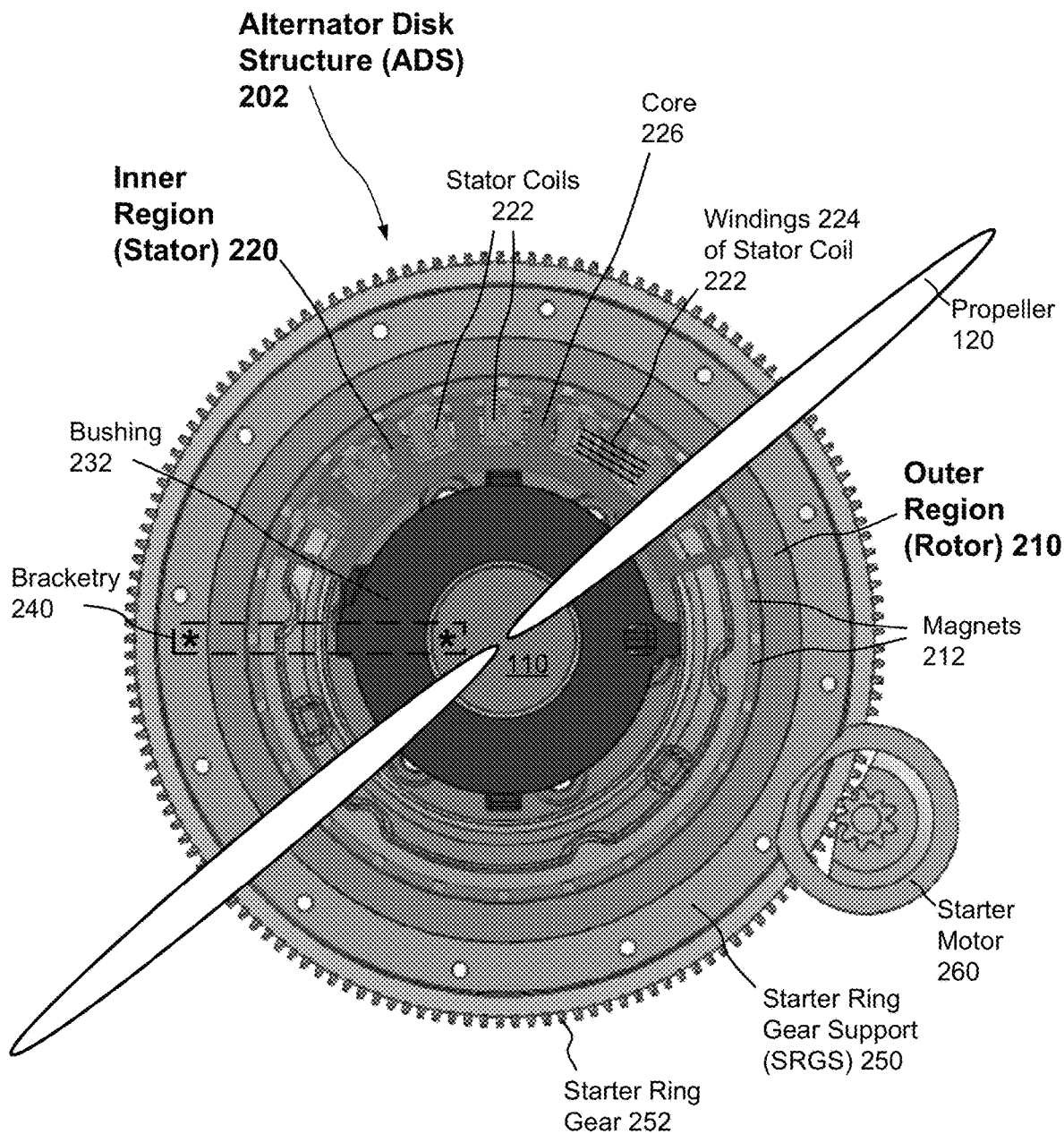
FIG. 2 is a front view of an alternator disk structure in accordance with an embodiment of the disclosure.

FIG. 2 shows an example alternator disk structure (ADS) 202 in accordance with embodiments of the instant disclosure. As shown, the ADS 202 includes an outer region 210 (e.g., first region) and an inner region 220 (e.g., second region). The outer region 210 houses a rotor, and the inner region 220 houses a stator. The outer region 210 includes magnets 212 of the rotor, e.g., permanent magnets, such as neodymium magnets. Such magnets are lightweight and high strength. Other suitable examples of permanent magnets may include Ferrite, Alnico, Samarium Cobalt, and the like. As an alternative, other types of magnets, such as electromagnets, may also be used. The magnets 212 have alternating north-south polarity and may be mounted to a support, which may be composed of steel or laminated steel, for example. The inner region 220 includes stator coils 222. Although shown as separate portions (the view is sectional), the stator coils 222 include windings 224 that wrap round projections in a laminated core 226 of the stator. In an example, the core is made of steel, such as electrical steel, and the laminations are provided to reduce eddy-current losses. The stator coils may be constructed from any elongated conductive material that has external insulation to avoid forming short circuits with neighboring windings 224 or other conductive components. Non-limiting examples include insulated copper or aluminum wire (e.g., round, square, or any other suitable cross-sectional shape), insulated metallic foils, and the like. The stator and thus the stator coils 222 are stationary with respect to the engine 100. Stator coils 222 may thus be wired in any convenient manner to electronics within the vehicle.

Also depicted in FIG. 2 is a propeller 120 connected to a drive shaft 110 of the engine 100. A coupling 240, which is drawn merely for schematic purposes, couples the outer region 210 to the drive shaft 110, such that the outer region 210 containing the rotor is made to rotate along with the drive shaft 110, while the inner region 220 remains stationary. As the engine 100 turns the propeller 120, the magnets 212 in the outer region 210 (rotor) move past the windings 224 of stator coils 222 in the inner region 220 (stator), inducing electric current therein, which may be distributed to various loads within the vehicle.

In the example shown in FIG. 2, the ADS 202 is provided as part of a starter ring gear support (SRGS) 250. The SRGS 250 is disk-shaped and has external teeth, which form a starter ring gear 252 arranged to engage teeth of a starter motor 260. When operating, the starter motor 260 spins the SRGS 250 and causes the drive shaft 110 to rotate, for starting the engine 100.

By providing the ADS 202 as part of the SRGS 250, the design leverages existing hardware that may normally be provided as part of a typical aircraft. The ADS 202 may thus be implemented with minimal added weight and additional componentry. Providing the ADS 202 as part of the SRGS 250 is merely an example, however. Alternatively, the ADS 202 may be provided separately from any SRGS, such as on its own dedicated disk assembly.

The ADS 202 provides many benefits over belt-driven alternators. As the ADS 202 does not require any belts, there are no belts to tension or replace. Also, the permanent-magnet design of some embodiments requires no brushes, and thus there are no brushes to maintain or replace. The ADS 202 is thus expected to provide a long and trouble-free service life.

The arrangement of FIG. 2 may be varied to suit a variety of power requirements. For example, magnets 212 may be placed closer to the outside rim of the outer region 210 (e.g., where the gear 252 is shown), and the outer region 210 may itself be modified to have a larger diameter. Stator coils 222 may be moved outwardly correspondingly. The effect of moving the magnets 212 and coils 222 outwardly is to increase power output, as the linear speed of magnets 212 across coils 222 (and therefore the generated power) increases with radial distance. Farther outward placement also enables a greater number of magnets and/or coils to be used, which further increases power.

Figure 3A:
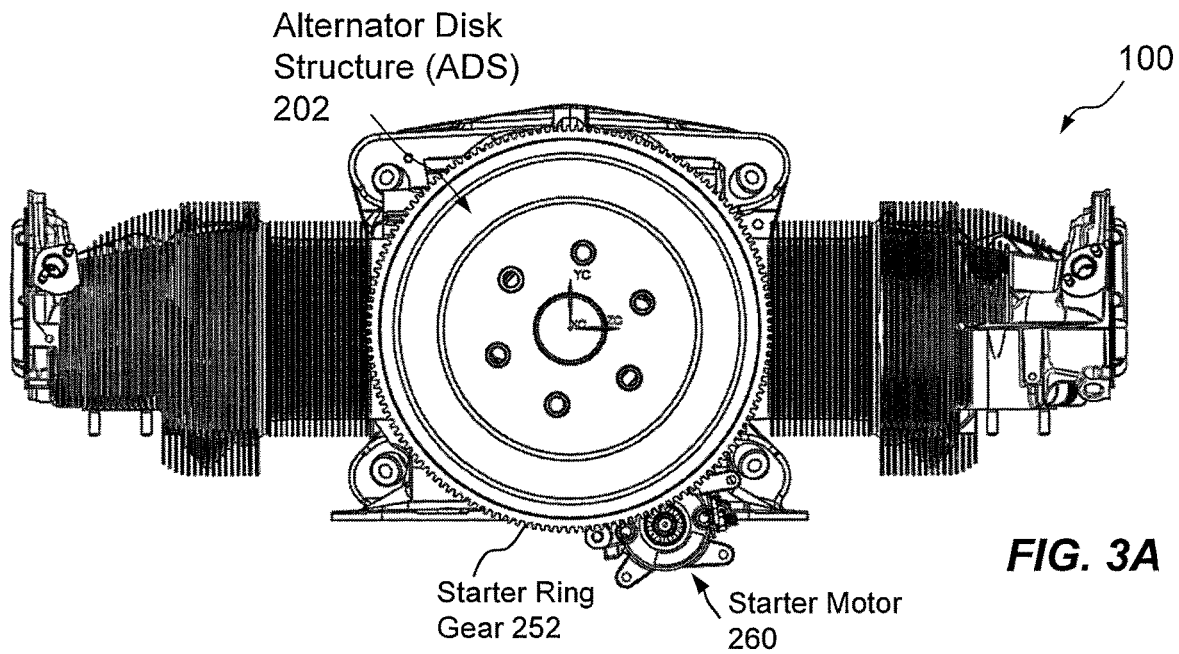
FIGS. 3A and 3B are respectively front and side views of the alternator disk structure of FIG. 2.
Figure 3B:
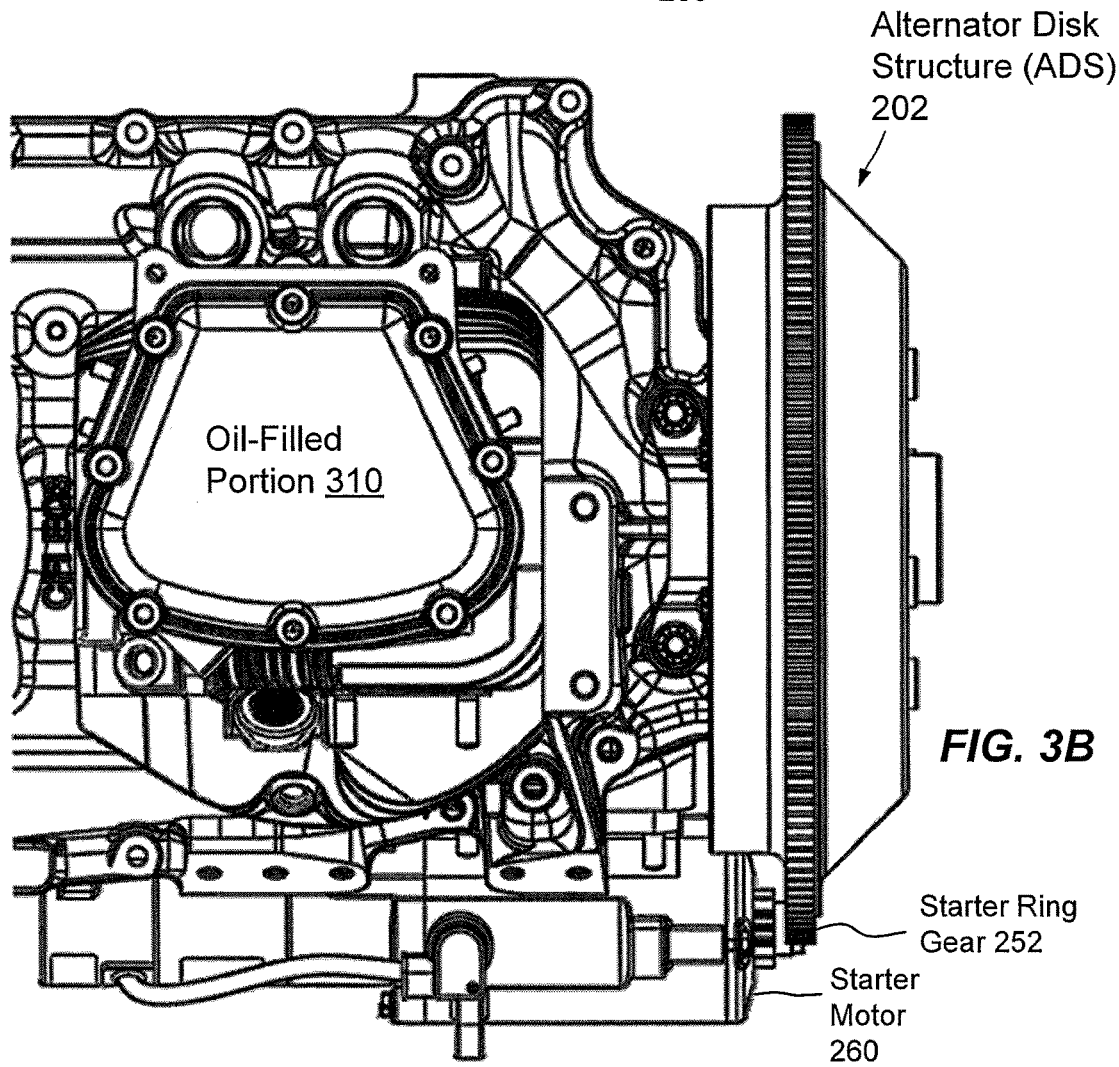

FIGS. 3A and 3B show additional examples of ADS 202 (front and side views, respectively). Additional parts of the engine 100 are further shown.

Figure 4:
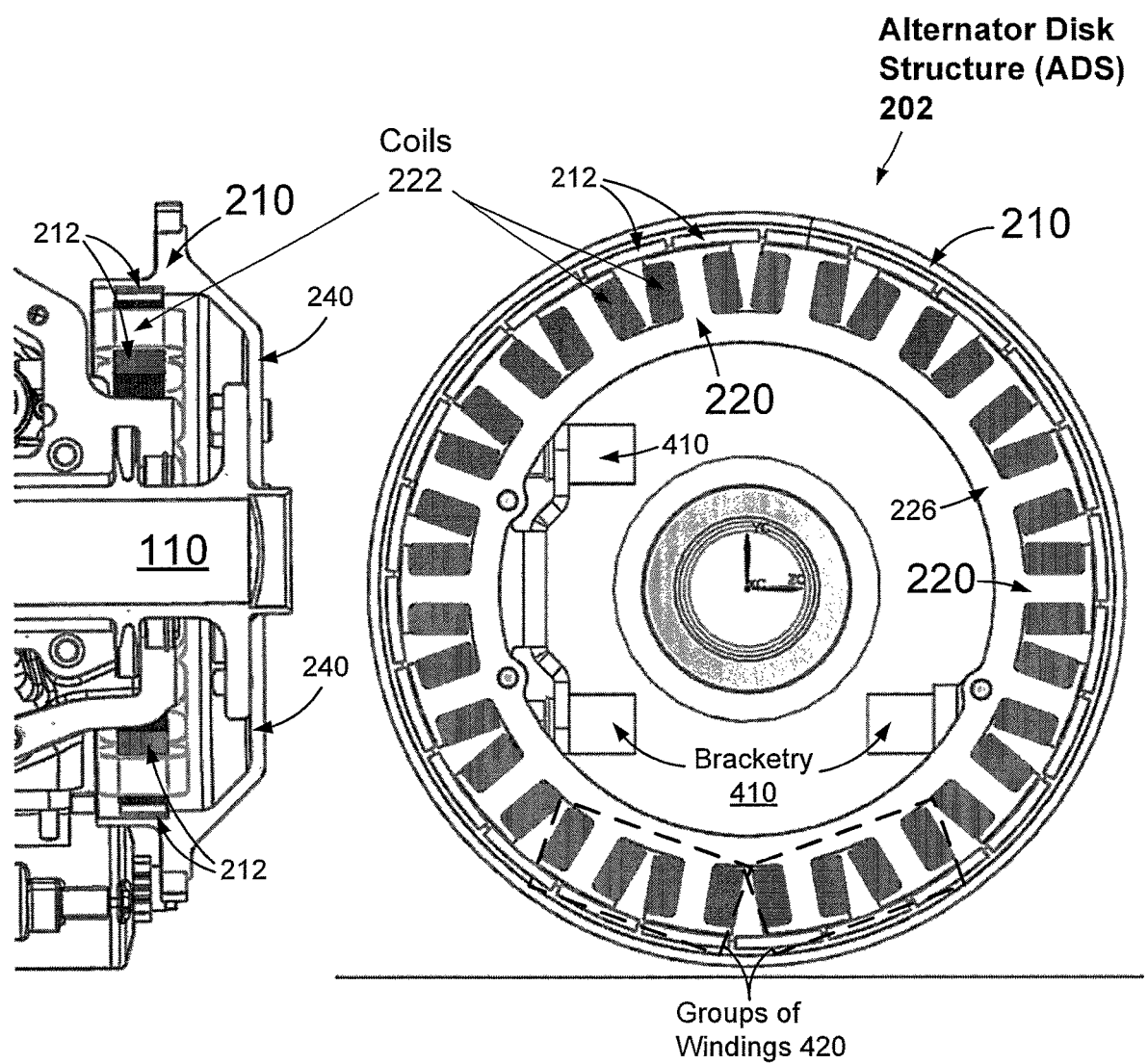
FIG. 4 is a cross-sectional side view and a cross-sectional front view of one example embodiment.

FIG. 4 shows a first example design. Here, ADS 202 may have coils 222 with two independent, dedicated outputs. Alternatively, outputs of coils 202 may be combined, e.g., by connecting them in series, in parallel, or in any other suitable manner. FIG. 4 shows a fully populated arrangement, with stator coils 222 extending around a full 360 degrees. This arrangement is suitable for higher-power demands.

FIG. 4 further shows an example implementation of coupling 240 (FIG. 2), shown here as a dome-shaped cover, such as a cover of the SRGS 250. The depicted cover is integral with magnets 212 of the outer region 210 (rotor), such that an outer extent of the cover can be regarded as the above-described outer region 210. As the drive shaft 110 rotates, the coupling/cover 240 rotates along with the drive shaft 110, causing the magnets 212 to move past the coils 222 of the stator, which remain rotationally fixed relative to the engine 100. For example, as shown to the right in FIG. 4, bracketry 410 may be provided to attach the inner region 220 (stator) to a stationary part of the engine 100, such as crankcase, engine block, or other engine structure.

Figure 5:
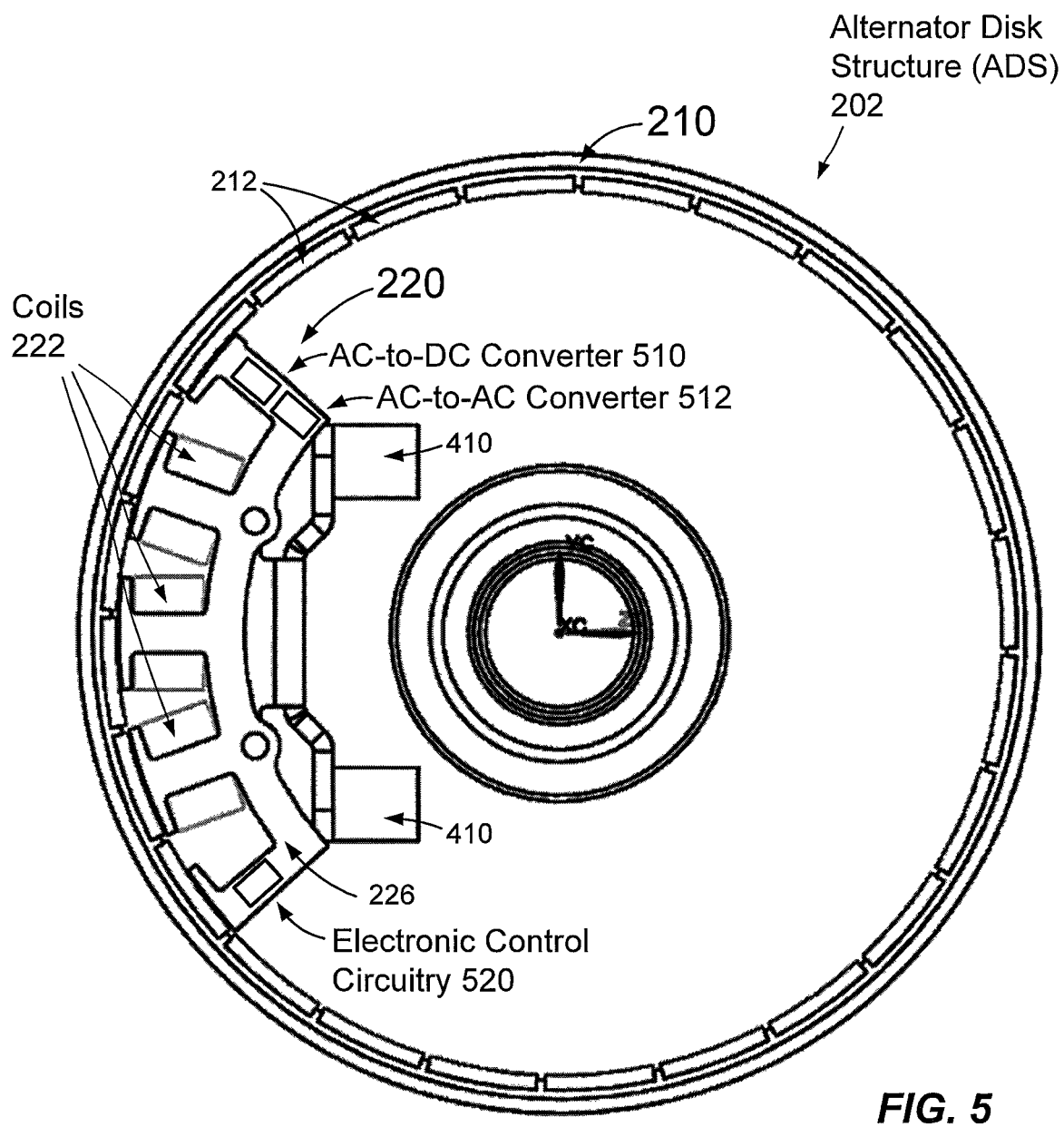
FIG. 5 is a cross-sectional front view of another example embodiment.

FIG. 5 shows another example. Here, stator windings (coils) 222 are provided over only a small portion of the inner region 220, such as a partial arc length. The FIG. 5 arrangement is thus suitable for medium-power requirements. It is simpler, lighter, and requires less bracketry 410 than the arrangement of FIG. 4. In the particular example shown, 3 coils 222 provide 3-phase power, which may be suitable for powering a 3-phase ECU (electronic control unit), for example.

FIGS. 6A and 6B show additional examples. FIG. 6A shows an example 2-coil, single-phase ADS 202 suitable for driving two subsystems. The coils 222 in FIG. 6A may share the same stator laminations (core 226) and bracketry 410. FIG. 6B is similar but provides a lighter-weight arrangement. The arrangements of FIGS. 6A and 6B are suitable for lower-power applications, as well as in cases where two independent outputs are desired.

FIG. 7 shows an example placement of the above-described engine 100 and ADS 202 within an airplane 700. As shown, the ADS 202 may be disposed between the engine 100 and the propeller 120, where it is easily accessed for inspection, maintenance, and service. Although the depicted example shows a tractor arrangement, the same principles apply to pusher arrangements, where the propellor is located at the rear of the airplane.

Having described certain embodiments, numerous alternative embodiments or variations can be made. For example, some arrangements may switch the positions of the rotor and the stator, such that the rotor is provided in the inner region 220 and the stator is provided in the outer region 210. Also, embodiments may be constructed in which rotor magnets pass by stator coils axially, rather than radially, e.g., in a single or dual-disk arrangement.

Further, the embodiments disclosed above show an ADS 202 that has only a single rotor. This is merely an example, as alternative embodiments may provide two separate rotors. For example, an ADS can include not only an external rotor (as shown above), but also an internal rotor. The two rotors in this arrangement are coupled together such that they rotate together along with the drive shaft. In this dual-rotor design, separate stator coils may be provided close to an inside edge of the stator, so that magnets of the internal rotor pass closely by such stator coils as the rotor spins relative to the stator.

Further, one should appreciate that the term "alternator" as used herein is intended to cover any electro-mechanical device that converts rotational energy into electrical energy. This definition of "alternator" may thus include devices commonly referred to as "generators" as well as those commonly referred to as "alternators."

Further, although features have been shown and described with reference to particular embodiments hereof, such features may be included and hereby are included in any of the disclosed embodiments and their variants. Thus, it is understood that features disclosed in connection with any embodiment are included in any other embodiment.

As used throughout this document, the words "comprising," "including," "containing," and "having" are intended to set forth certain items, steps, elements, or aspects of something in an open-ended fashion. Also, as used herein and unless a specific statement is made to the contrary, the word "set" means one or more of something. This is the case regardless of whether the phrase "set of" is followed by a singular or plural object and regardless of whether it is conjugated with a singular or plural verb. Also, a "set of" elements can describe fewer than all elements present. Thus, there may be additional elements of the same kind that are not part of the set. Further, ordinal expressions, such as "first," "second," "third," and so on, may be used as adjectives herein for identification purposes. Unless specifically indicated, these ordinal expressions are not intended to imply any ordering or sequence. Thus, for example, a "second" event may take place before or after a "first event," or even if no first event ever occurs. In addition, an identification herein of a particular element, feature, or act as being a "first" such element, feature, or act should not be construed as requiring that there must also be a "second" or other such element, feature or act. Rather, the "first" item may be the only one. Also, and unless specifically stated to the contrary, "based on" is intended to be nonexclusive. Thus, "based on" should not be interpreted as meaning "based exclusively on" but rather "based at least in part on" unless specifically indicated otherwise. Although certain embodiments are disclosed herein, it is understood that these are provided by way of example only and should not be construed as limiting.

Those skilled in the art will therefore understand that various changes in form and detail may be made to the embodiments disclosed herein without departing from the scope of the following claims.

What is claimed is:

1. An apparatus for generating electrical power in an aerial vehicle having an engine, a propeller, and a drive shaft coupled between the engine and the propeller, the apparatus comprising:
   an alternator disk structure (ADS) disposed between the engine and the propeller, the ADS including an inner region and an outer region,
   the inner region of the ADS being rotationally fixed relative to an engine block of the engine and including a stator, the stator having windings,
   the outer region of the ADS being free to rotate relative to the inner region, the outer region coupled to the drive shaft and including a rotor,
   wherein the rotor of the outer region is constructed and arranged to spin relative to the stator of the inner region in response to rotation of the drive shaft by the engine, thereby inducing electrical current in the windings of the stator, and
   wherein the outer region is part of a starter ring gear support (SRGS) concentric with the drive shaft and coupled to an electric starter, the SRGS constructed and arranged to rotate the drive shaft for starting the engine.

2. The apparatus of claim 1, wherein the ADS is disposed within a cowling of the aerial vehicle.

3. The apparatus of claim 2, wherein the ADS is disposed outside any oil-filled portion of the engine.

4. The apparatus of claim 1, wherein the outer region is coupled to the drive shaft via a coupling.

5. The apparatus of claim 1, wherein the rotor includes a plurality of permanent magnets uniformly spaced at regular angular intervals.

6. The apparatus of claim 1, wherein the windings of the inner region are provided in multiple groups, wherein the windings within each group are electrically connected together but are electrically isolated from the windings of any other group.

7. The apparatus of claim 1, wherein the inner region has an outer circumference, and wherein the windings of the inner region are disposed along the outer circumference in a clustered manner, such that the windings are not distributed uniformly along the outer circumference.

8. The apparatus of claim 1, further comprising at least one AC-to-DC converter integral to the inner region.

9. The apparatus of claim 1, further comprising at least one AC-to-AC converter integral to the inner region.

10. The apparatus of claim 1, further comprising electronic control circuitry coupled to the stator, the electronic control circuitry constructed and arranged to back-drive the windings of the stator.

11. The apparatus of claim 10, wherein the electronic control circuitry constructed and arranged to back-drive the windings of the stator is further constructed and arranged to start the engine.

12. The apparatus of claim 10, wherein the electronic control circuitry constructed and arranged to back-drive the windings of the stator is further constructed and arranged to provide power for rotating the propeller in a fuel-electric hybrid arrangement.

13. The apparatus of claim 1, wherein the SRGS includes a dome-shaped cover disposed between the inner region of the ADS and the propeller, the dome-shaped cover concentric with the drive shaft and forming a starter gear ring constructed and arranged to engage the electric starter for starting the engine.

14. The apparatus of claim 1, further comprising:
bracketry coupled between the inner region of the ADS and an engine block of the engine, the bracketry rotationally fixing the inner region relative to the engine block.

15. The apparatus of claim 1, wherein the inner region has an outer circumference and wherein the windings of the inner region are arranged in a partial arc along the outer circumference.

16. A method of generating electrical power in an aerial vehicle, comprising:
operating an engine of the aerial vehicle to rotate a propeller via a drive shaft coupled between the engine and the propeller;
providing a first disk region that is rotationally fixed relative to an engine block of the engine, the first disk region including a stator;
providing a second disk region that is part of a starter ring gear support (SRGS) concentric with the drive shaft and coupled to an electric starter, the SRGS constructed and arranged to rotate the drive shaft for starting the engine, the first disk region and the second disk region each being concentric with the drive shaft, the second disk region including a rotor;
coupling the drive shaft to the second disk region, such that an array of magnets of the rotor rotates along with the drive shaft; and
as the array of magnets rotates, inducing electrical current to flow within windings of the stator.

17. An aerial vehicle, comprising:
an engine having a drive shaft and an engine block;
a propeller coupled to the drive shaft, the drive shaft coupled between the engine block and the propeller;
a first disk region rotationally fixed relative to the engine block and including a stator, the stator having windings, and
a second disk region coupled to the drive shaft and including a rotor,
wherein the first disk region and the second disk region are each concentric with the drive shaft,
wherein the second region is constructed and arranged to spin relative to the first region in response to rotation of the drive shaft, thereby causing the rotor to rotate relative to the stator and inducing electrical current in the windings of the stator, and
wherein the second disk region is part of a starter ring gear support (SRGS) concentric with the drive shaft and coupled to an electric starter, the SRGS constructed and arranged to rotate the drive shaft for starting the engine.

18. The aerial vehicle of claim 17, wherein the drive shaft is coupled with and extends through the SRGS between the engine block and the propeller.

* * * * *